Feb. 4, 1964    N. C. PROCTOR ETAL    3,120,153
BROACHING MACHINE

Filed Jan. 19, 1962    3 Sheets-Sheet 1

Inventors:
Norman Cooper PROCTOR
Rene PATENAUDE

Attorney.

Inventors:
Norman Cooper PROCTOR
Rene PATENAUDE

Attorney.

Inventors:
Norman Cooper PROCTOR
Rene PATENAUDE

United States Patent Office 3,120,153
Patented Feb. 4, 1964

3,120,153
BROACHING MACHINE
Norman C. Proctor, Mount Royal, Quebec, and Rene Patenaude, Vaudreuil, Quebec, Canada, assignors to Northern Electric Company, Limited, Montreal, Quebec, Canada, a corporation of Canada
Filed Jan. 19, 1962, Ser. No. 167,286
10 Claims. (Cl. 90—69)

This invention relates generally to broaching machines and has particular reference to machines of this nature designed for broaching precious metals or expensive metallic alloys.

When machining such metals and alloys it is essential that virtually all shavings and metal particles be recovered if the machine is to be commercially successful. In addition, if the broach cutting edges are kept free of such particles, cleaner and more accurate work results.

Broaching machines known to the art suffer from certain defects which have been rectified by the invention. Previous broaching devices do not rid themselves completely of metal cuttings and shavings with the result that the machined stock may be scratched and scored. Furthermore, loss results from incomplete recovery of the cuttings.

The invention resides primarily in the use of a pair of longitudinally slidable contiguous broaching blades adapted to move independently of one another during at least part of the broaching cycle. This relative motion between the blades has proved to be highly effective in dislodging adhering particles of metal.

In addition, at the time of dislodgement, an air blast is directed into a cavity between the blades.

The combination of the sliding blades and the air blast results in virtually complete recovery of the cuttings and as a consequence, cleaner and more accurate work is produced due to the absence of metal particles on or adjacent the cutting edges of the broaches.

In the drawings, in which like reference numbers refer to like parts, which illustrate the invention:

Figure 1:
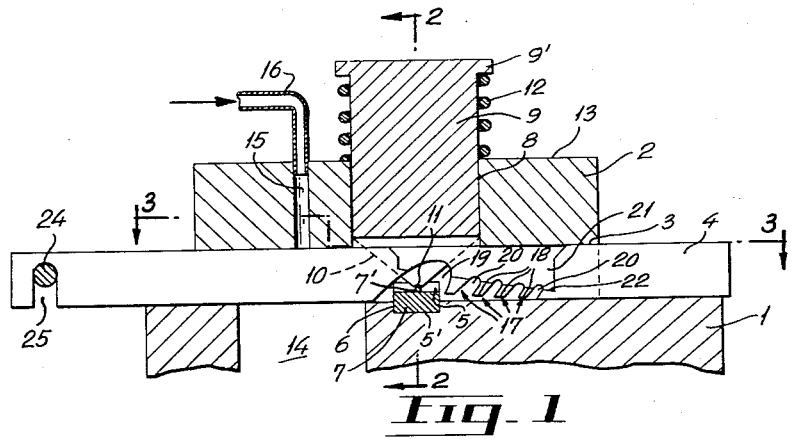
FIG. 1 is a sectional elevational view of the broaching machine taken on a plane passing vertically between the broaching blades.
Figure 2:
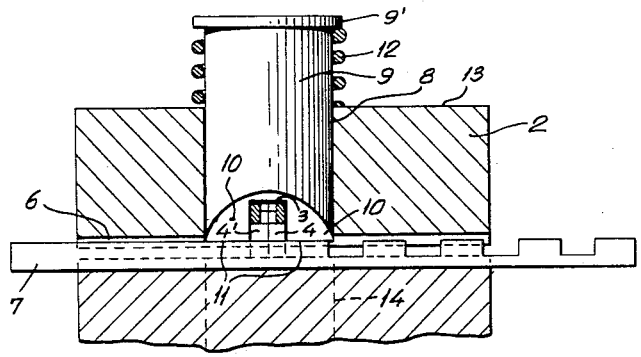
FIG. 2 is a sectional elevational view taken on the line 2—2 of FIG. 1.
Figure 3:
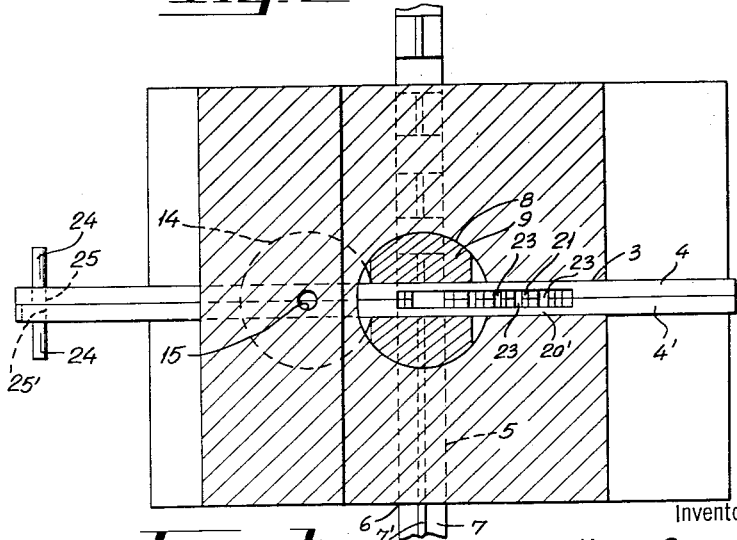
FIG. 3 is a sectional plan view taken on the line 3—3 of FIG. 1.

The machine illustrated comprises a bed-plate 1 upon which is mounted by any suitable means, such as by bolting, a metal head-piece 2.

Extending longitudinally through the head-piece 2 is a rectangular slot 3. The width and depth of the slot 3 are such as to snugly accommodate a pair of contiguous broaching blades 4 and 4' but to permit free endwise travel of the blades within the slot together with movement of one blade relative to the other. The word "contiguous" as used herein is intended to imply physical contact.

The head-piece is also provided with an inverted channel 5 positioned at right angles to the slot 3. This channel, together with an opposed complementary channel 5' extending across the bed-plate 1 forms a passageway 6 through which unworked stock 7 is advanced to undergo broaching. The stock 7 is rectangular in cross-section and is provided with an integral spine 7'. This configuration is not essential to the operation of the machine, however, as it will accept any generally rectangular stock having dimensions equal to or less than those of the passageway.

A cylindrical vertically disposed opening 8 is formed within the head-piece 2 centered upon the point of intersection of the centre lines of slot 3 and channel 5.

A slidable cylindrical clamp 9, provided with an upper encircling flange 9' is positioned within the opening 8. The lower end of the clamp is wedge-shaped and bifurcated to form legs 10, the apices 11 of which are blunted to prevent scoring of the stock 7 against which they bear in a manner to be described later.

A compression spring 12 encircles the clamp 9 between the upper surface 13 of the head-piece 2 and the flange 9'. This spring by exerting pressure against the underside of the flange 9' serves to bias the clamp 9 upwardly.

A well 14 located on the centre line of the slot 3 extends vertically through the bed-plate 1. The lower end of the wall is provided with a recovery basket (not shown) designed to receive cuttings and metal particles resulting from the broaching operation as will be later described.

Concentric with the well 14 is an air duct 15 extending vertically through the head-piece 2 from the upper surface 13 thereof to the top of the slot 3. Compressed air is conveyed to the duct from a compressor (not shown) or compressed air tank (not shown) through a pipe 16 threadably attached within the upper end of the duct.

Broaching blades 4 and 4' are essentially the same but differ in two important respects. Each consists of an elongated body rectangular in cross section provided with a series of inclined broaching teeth 17. The vertical distances between the cutting edges 18 of the teeth and the surface of the bed-plate 1 gradually diminished from lefe to right as is shown particularly in FIGS. 4 to 7 inclusive.

Forwardly of the first broaching tooth is an enlarged gap 19 wider and deeper than the gaps 20 between the teeth 17.

The thickness of the blades immediately above the teeth 17 and the gap 19 is reduced as at 20 and 20' so as to form a deep cavity 21 within the blades. The bottom surface 21' of this cavity is broken by the gaps 19 and 20 thereby forming openings 23. This construction permits air travelling downwardly into the cavity to exit through the openings.

A pin 24 extends transversely into the slots 25 and 25' located adjacent the left-hand ends of the blades 4 and 4'. This pin is connected to a mechanism for imparting a longitudinal reciprocating motion to the blades. The length of the stroke is indicated by the extreme positions of the blades shown in FIGS. 1 and 6.

Figure 5:
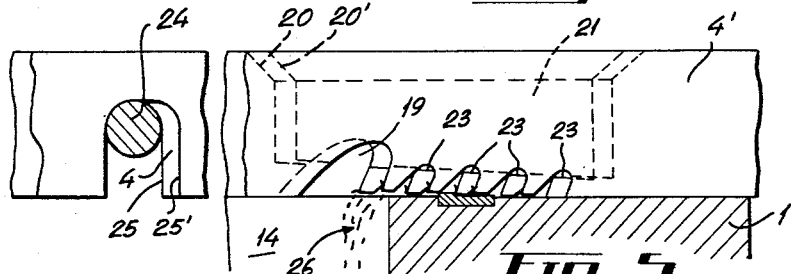
FIG. 5 is a view showing the positions of the blades during the cutting stroke.
Figure 7:
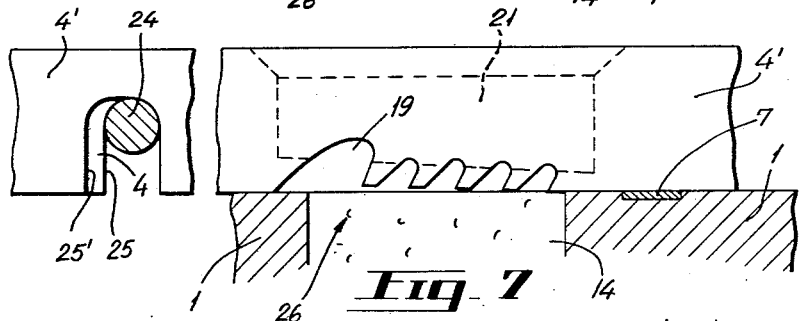
FIG. 7 shows the positions of the cutting blades immediately after the return stroke has commenced.

The slot 25 in blade 4 has a width sufficient to snugly receive the pin 24. The width of the slot 25' in blade 4' is greater than that of the slot 25 by an amount equal to one-half the pitch of the teeth 17. When the pin is in contact with the right-hand edges of the slots 25 and 25' and the blades are moving to the right, the teeth 17 are aligned as shown in FIG. 7. When the pin is in contact with the left-hand edges of the slots 25 and 25' and the blades are moving to the left the teeth 17 are staggered as illustrated in FIG. 5.

Figure 4:
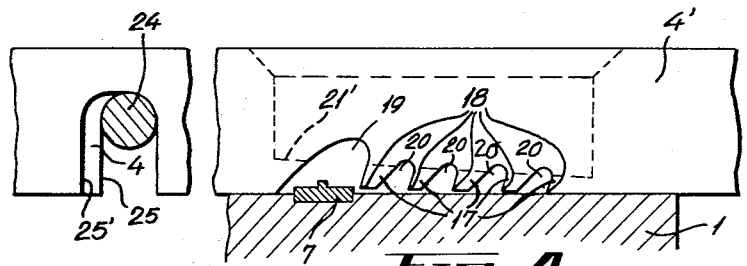
FIG. 4 is a view of the broaching blades in the position which they assume just prior to the commencement of the cutting stroke.

The improved broaching machine operates in the following manner:

Blades 4 and 4' are shifted to their extreme right-hand positions as shown in FIGS. 1 and 4. A piece of unworked stock 7 is introduced into the passageway 6 and is extended through the enlarged gap 19 in the blades 4 and 4'. A downward force, by a means not shown, is exerted against the upper end of the clamp 9. The blunt apices of the wedge-shaped legs 10 clamp the stock 7 securely in position.

The pin then travels to the left until it contacts the left-hand edge of slot 25' at which time blade 4 has shifted relative to blade 4' to bring the teeth of the two blades into staggered relationship. The greater distance between the edges of the slot 25' as compared to those of the slot 25 in association with the pin 24 results in what is commonly referred to as a "lost-motion" mechanism.

The cutting or broaching operation is performed with the teeth positioned as in FIG. 5. Since the gaps between the cutting edges of the teeth and the surface of the bed-plate diminish from left to right, each broach removes a prescribed amount of material from the stock.

As the broaching operation proceeds, cuttings and metal particles 26 are carried forwardly and drop into the well 14 where they are recovered.

As the cavity 21 uncovers the lower end of the duct 15, compressed air is introduced into the pipe 16 and blows downwardly through the cavity and between the teeth through openings 23. Any metallic particles adhering loosely to the teeth are carried downward by the force of the airstream into the well 14.

Figure 6:
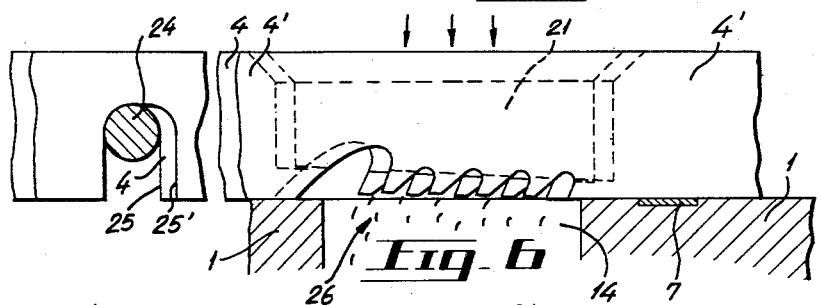
FIG. 6 shows the positions of the blades at the extreme end of the cutting stroke.

FIG. 6 illustrates the pin 24 and blades 4 and 4' in the extreme left-hand position following completion of the broaching operation. Air continues to flow directly through the cavity 21, the openings 23 and into the well 14.

The pin 24 has commenced the return stroke in FIG. 7 and has moved toward the right a distance equal to one-half the pitch of the broaching teeth. Blade 4 has shifted immediately in obedience to the movement of the pin. Blade 4' has not yet commenced to move but the pin is contacting the right-hand edge of slot 25'. Any further movement of the pin to the right will result in impelling both blades simultaneously. When this occurs, due to the shifting of blade 4 relative to blade 4', the broaching teeth will have moved into alignment. The relative motion of the blades at this point has the effect of dislodging the last remaining metal particles from the broaches which are aided in their downward movement by the air-stream. Complete removal of all such particles from the blades results. The teeth remain in aligned relationship during the return stroke of the blades. At the conclusion of the return stroke the blades are stopped. Downward pressure upon the clamp 9 is released and this member is lifted by the spring 12 to free the stock 7. This completes one work cycle.

Figure 8:
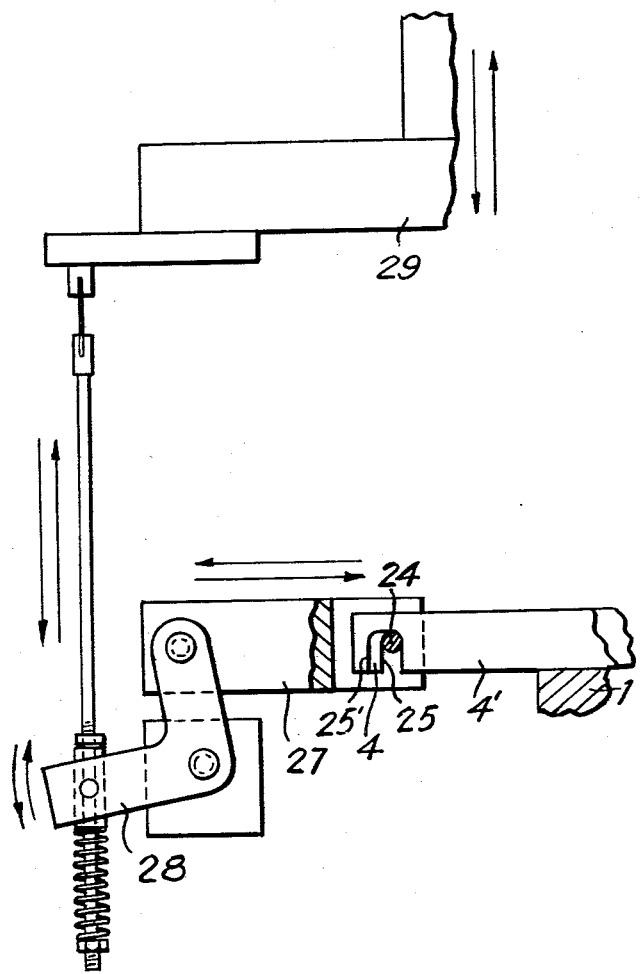
FIG. 8 shows the mechanism for the reciprocation of the broaching blades.

The reciprocating motion of the pin 24 may be obtained by a device as shown in FIG. 8 in which the drawbar 27 reciprocates the broach blades 4, 4' by the bellcrank 28 which is reciprocated by the punch holder 29.

The stock is then advanced a predetermined distance, the clamp is lowered and the broaching cycle is repeated.

What is claimed is:

1. A broaching machine comprising a pair of contiguously positioned broaching blades, means for supporting said blades, means for moving said blades through a work cycle and means for displacing one blade relative to the other during at least a portion of said work cycle.

2. A broaching machine comprising, in combination, a pair of contiguously positioned broaching blades, means for supporting said blades, means for moving said blades through a work cycle, means for displacing one blade relative to the other during at least a portion of said work cycle and means for causing a stream of air to impinge upon said blades.

3. A broaching machine comprising in combination, a pair of contiguously positioned broaching blades provided with cutting teeth, means for supporting said blades, means for causing said blades to perform a work cycle, means for displacing one blade relative to the other for at least a portion of said work cycle and means for directing streams of air against said teeth.

4. A broaching machine comprising, in combination, a pair of contiguously positioned broaching blades, means for supporting said blades, means for imparting a reciprocating motion to said blades, means for displacing one blade relative to the other during at least a portion of the work cycle and means for directing a stream of air to impinge upon said blades.

5. A broaching machine comprising, in combination, a pair of contiguously positioned broaching blades, means for supporting said blades, means for imparting a reciprocating motion to said blades, lost-motion means associated with one blade and means for directing a stream of air to impinge upon said blades.

6. A broaching machine comprising, in combination, a pair of contiguously positioned broaching blades carrying a cutting teeth and provided with openings between said teeth, means for supporting said blades, means for reciprocating said blades, means for displacing one blade relative to the other and means for directing streams of forced air through said openings.

7. A broaching machine comprising, in combination, a pair of contiguously positioned broaching blades carrying cutting teeth and provided with openings between said teeth, means for supporting said blades, means for imparting a reciprocating motion to said blades, lost-motion means associated with one of said blades, and means for directing forced air through said openings.

8. A broaching machine comprising, in combination, a pair of contiguously positioned broaching blades carrying cutting teeth and provided with openings between said teeth, means for supporting said blades, means for imparting to said blades a reciprocating movement consisting of a cutting stroke and a return stroke, means for causing a shifting movement of one blade relative to the other during the return stroke and means for directing forced air through said openings at least during the occurrence of said shifting movement.

9. A broaching machine comprising a pair of contiguously positioned broaching blades each of which is equipped with a series of cutting teeth, means for supporting said blades, means for imparting to said blades a reciprocating motion consisting of a work stroke and a return stroke, means for causing said teeth in one blade to assume a staggered relationship with the teeth on the other blade during one of said strokes and for causing said teeth to assume an aligned relationship during the other of said strokes.

10. A broaching machine comprising, in combination, a pair of contiguously positioned, longitudinally slidable broaching blades each of which is equipped with a series of cutting teeth and is provided with openings between said teeth, means for supporting said blades, means for imparting to said blades a reciprocating motion consisting of a forward stroke and a return stroke, means for misaligning the teeth of one of said blades with those of the other of said blades during one of said strokes and means for directing forced air through said openings during at least a portion of one of said strokes.

No references cited.